United States Patent
Scholhamer et al.

(10) Patent No.: US 6,636,921 B1
(45) Date of Patent: Oct. 21, 2003

(54) SCSI REPEATER CIRCUIT WITH SCSI ADDRESS TRANSLATION AND ENABLE

(75) Inventors: George J. Scholhamer, Tomball, TX (US); William C. Galloway, Houston, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/507,278

(22) Filed: Feb. 18, 2000

Related U.S. Application Data

(60) Provisional application No. 60/120,938, filed on Feb. 19, 1999.

(51) Int. Cl.[7] .............................................. G06F 13/00
(52) U.S. Cl. ..................... 710/305; 710/314; 710/315; 714/2; 714/4
(58) Field of Search ................................. 710/305, 314, 710/315, 110, 2, 312; 714/2, 4

(56) References Cited

U.S. PATENT DOCUMENTS

| | | | |
|---|---|---|---|
| 5,239,632 A | * 8/1993 | Larner | 710/314 |
| 5,463,743 A | 10/1995 | Galloway | 395/285 |
| 5,522,054 A | 5/1996 | Gunlock et al. | 395/439 |
| 5,613,074 A | 3/1997 | Galloway | 395/280 |
| 5,675,723 A | 10/1997 | Ekrot et al. | 395/182.02 |
| 5,692,200 A | 11/1997 | Carlson et al. | 395/735 |
| 5,740,386 A | * 4/1998 | Miller et al. | 710/306 |
| 5,751,977 A | 5/1998 | Alexander | 395/306 |
| 5,771,359 A | * 6/1998 | Galloway et al. | 710/310 |
| 5,925,120 A | * 7/1999 | Arp et al. | 710/300 |
| 5,970,236 A | * 10/1999 | Galloway et al. | 712/300 |
| 6,408,343 B1 | * 6/2002 | Erickson et al. | 710/15 |

* cited by examiner

Primary Examiner—Rupal Dharia

(57) ABSTRACT

The present invention relates to a repeater circuit for providing effective point-to-point coupling between terminated Small Computer System Interface (SCSI) bus segments. The repeater circuit has an enable input and can perform SCSI address translation to map SCSI addresses from a narrow SCSI bus to high SCSI addresses on a wide SCSI bus.

19 Claims, 12 Drawing Sheets

SCSI REPEATER CIRCUIT WITH SCSI ADDRESS TRANSLATION AND ENABLE

SPECIFICATION

This application claims the benefit of U.S. Provisional Application No. 60/120,938, filed Feb. 19, 1999, which is incorporated herein by reference.

BACKGROUND OF THE INVENTION

1. Field of the Invention

The present invention relates to the addressing of multiple disk drives within computing systems and more particularly to a repeater circuit for enabling and addressing terminated bus segments.

2. Description of the Related Art

With the ever increasing amount of data being processed by today's computing systems, a mass storage subsystem is often desired for transferring large amounts of data to and from the computing system. Such a mass storage subsystem is commonly found in a local area network (LAN), wherein information and files stored in the mass storage subsystem are distributed, through one or more servers, to local work stations having limited or no mass storage capabilities.

The servers typically communicate with the mass storage subsystem through what is known as a Small Computer System Interface (SCSI) bus. To maximize the performance of the SCSI bus, the SCSI bus should not exceed a predetermined length. This predetermined length can be exceeded when a server, located in one box or unit, is connected through a SCSI cable to the mass storage subsystem, such as a disk drive array or a CD-ROM drive located in another box or unit. To prevent performance degradation, designers have implemented what is known as repeater circuits which are used to couple short, terminated SCSI bus segments. The repeater circuit includes two ports with each port connected to a different terminated SCSI bus segment. The repeater circuit provides a buffer between the terminated bus segments in order to achieve a high performance SCSI bus that exceeds the predetermined length.

Many disk storage subsystems typically use what is referred to as a narrow SCSI bus, which allows the addressing of up to eight SCSI devices and providing eight bit data transfers. In a typical narrow SCSI bus configuration, a SCSI bus controller, otherwise known as an initiator, occupies one address bit or SCSI ID bit; the remaining SCSI ID bits are occupied by up to seven disk drives, which are referred to as targets. The narrow SCSI bus should be contrasted to a higher performance SCSI bus, commonly referred to as a wide SCSI bus, which allows the addressing of up to sixteen SCSI devices and provides sixteen bit data transfers. In a typical wide SCSI bus configuration, the initiator will occupy one SCSI ID, and the remaining SCSI IDs will be occupied by up to fifteen targets. A typical solution for allowing a server using a wide SCSI bus to be fully compatible with a storage subsystem using a narrow SCSI bus has been for the server to downgrade its own performance to match that of the narrow SCSI bus, thereby sacrificing the performance advantage offered by the wide SCSI bus.

SUMMARY OF THE INVENTION

Briefly, the present invention relates to a SCSI bus repeater circuit that isolates devices on a terminated SCSI bus segment by buffering all SCSI bus signals. The physical configuration of a storage subsystem may contain many terminated SCSI bus segments, some of which may be narrow SCSI buses. The present invention relates to a repeater circuit that provides SCSI address translation so two repeater circuits can couple two narrow SCSI buses to one wide SCSI bus with the two narrow SCSI buses then appearing as a single logical wide SCSI bus. Thus, a SCSI bus server coupled to the wide SCSI bus can maintain compatibility with a narrow SCSI bus storage subsystem without the SCSI bus server sacrificing the performance of a wide SCSI bus. Thus, the repeater circuit of the present invention provides logical mapping for terminated bus segments.

The present invention also relates to a repeater circuit which can be utilized in a fault tolerant storage system. In such a system, the repeater circuit is coupled to a first terminated SCSI bus connected to a server and a second terminated SCSI bus connected to target devices. In the preferred embodiment, the repeater circuit has a reset detection circuit that detects inband signaling by an inactive secondary server coupled to the first bus. This in-band signaling indicates that an active primary server has failed and the secondary server has detected this failure. The repeater circuit provides a switch signal, indicative of this condition, to an embedded controller of the storage subsystem. The embedded controller then enables and disables repeater circuits of the storage subsystem accordingly in order to provide a fault tolerant, mass storage subsystem.Thus, Thus, the repeater circuit of the present invention provides logical mapping for terminated bus segments. Furthermore, the repeater circuit allows sections of terminated SCSI bus segments of a network, coupled to one or more SCSI devices, to be switched in and out of the network dependent on the status of the servers of the network.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

This application is related to the following United States patent and patent applications which are hereby incorporated by reference:

U.S. Pat. No. 5,675,723, entitled "Multi-Server Fault Tolerance Using In-Band Signaling," issued Oct. 7, 1997;

U.S. patent application Ser. No. 07/955,669 entitled "Method of Communicating with a SCSI Bus Device that does not have an Assigned SCSI Address," filed Oct. 2, 1992;

U.S. patent application attorney docket no. A98228US, entitled "Communication Mode Between SCSI Devices," filed concurrently herewith;

U.S. patent application attorney docket no. A98229US, entitled "SCSI Data Rate Speed Determination," filed concurrently herewith;

U.S. patent application attorney docket no. A98230US, entitled "SCSI Clock Stretching," filed concurrently herewith; and U.S. patent application attorney docket no. A98231US, entitled "Set Up Time Adjust," filed concurrently herewith.

Figure 1:
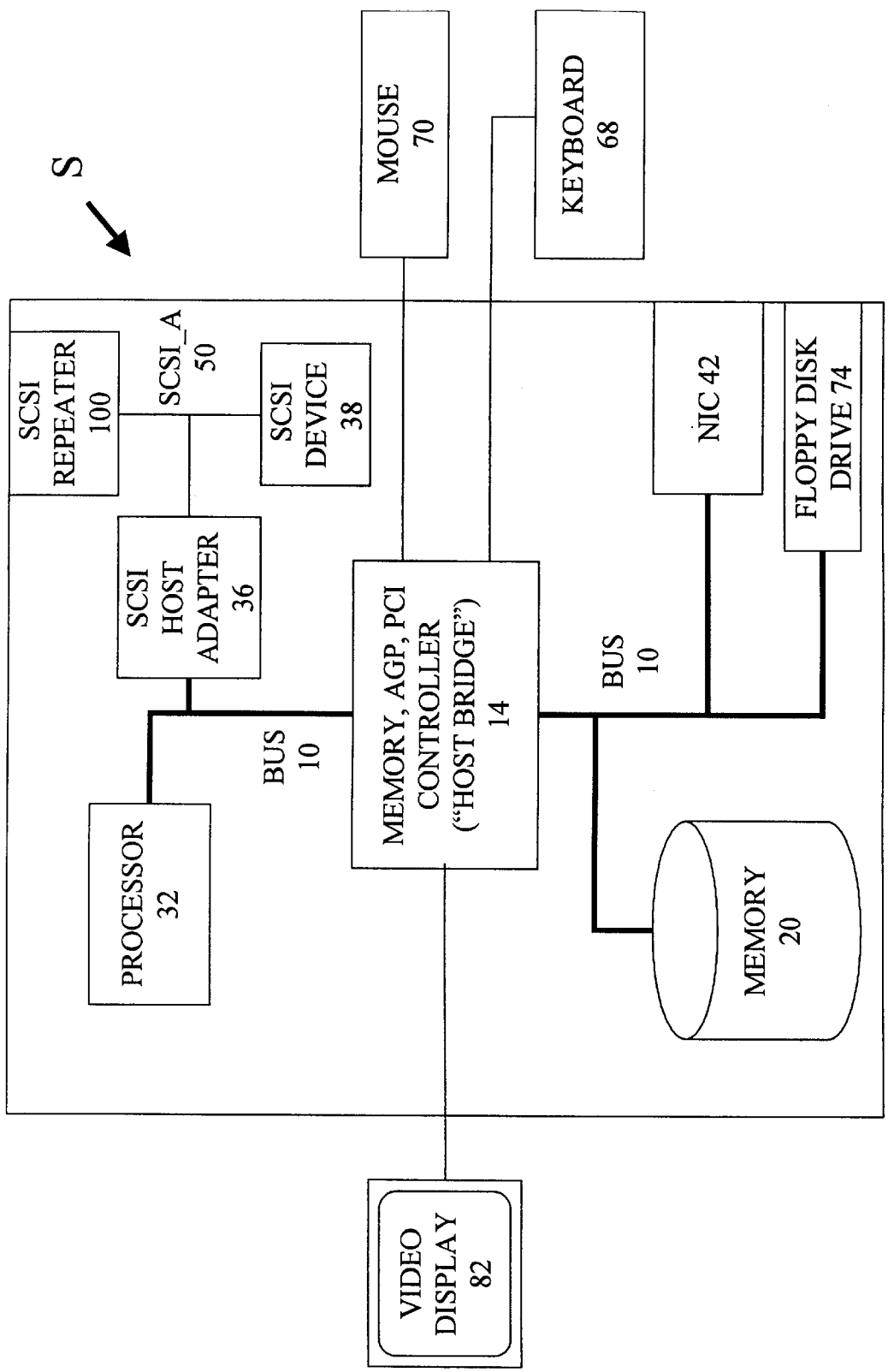
FIG. 1 is a block diagram of a computing system S showing a data bus, peripheral devices, and a SCSI host adapter.

Turning to FIG. 1, illustrated is a typical computing system S in which a repeater circuit of the present invention can be installed. The computing system S in the illustrated embodiment is a PCI bus based machine, having a peripheral component interconnect (PCI) bus 10. The PCI bus 10 is controlled by PCI controller circuitry located within a memory/accelerated graphics port (AGP)/PCI controller 14. This controller 14 (the "host bridge") couples the PCI bus 10 to a processor 32 and a memory subsystem 20.

The host bridge 14 in the disclosed embodiment is a 440LX Integrated Circuit by Intel Corporation, also known as the PCI AGP Controller (PAC). The processor 32 is preferably a Pentium II. The processor 32 could be replaced with a different processor, other than the Pentium II, without detracting from the spirit of the invention.

The PCI bus 10 couples a variety of devices that generally take advantage of a high-speed data path. This includes a network interface controller (NIC) 42, which preferably supports the ThunderLan™ power management specification by Texas Instruments, and a floppy disk drive 74. The floppy disk drive 74 preferably would be a 3½ " floppy disk. A video display 82, a mouse 70, and a keyboard 68 can also be coupled to the host bridge 14, enabling human interaction with the computing system S.

Finally, a SCSI host adapter 36 is shown connected to the PCI bus 10. Connected to the SCSI host adapter 36 by means of a SCSI_A bus 50 are a SCSI device 38 and a repeater circuit 100 according to the present invention. The SCSI device 38 might be an internal device such as a CD-ROM drive or a tape drive.

The computing system S illustrates only one platform that can utilize the device according to the present invention. The present invention is also not necessarily restricted to a SCSI bus; any bus that can be attached to a computing system of any type can incorporate the present invention.

Figure 2:
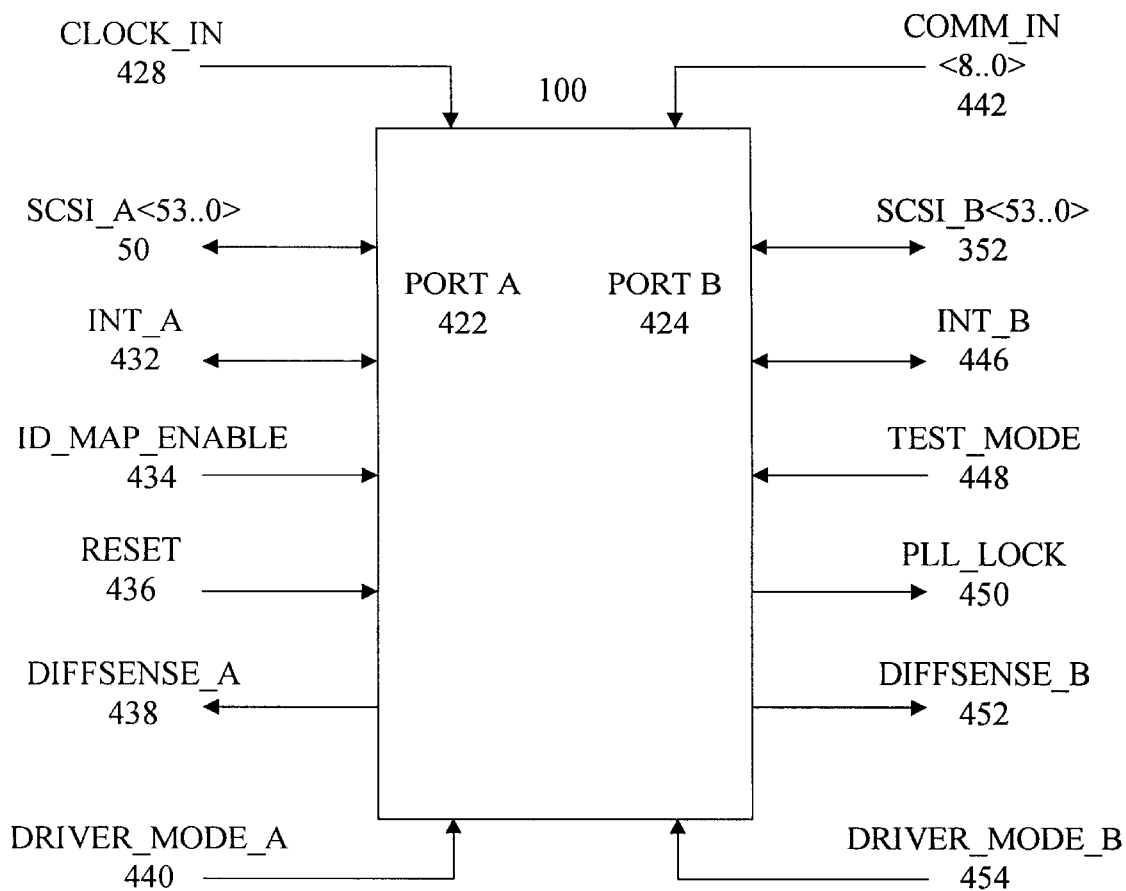
FIG. 2 is a signal diagram illustrating the input and output signals of the repeater circuit according to the present invention.

Turning now to FIG. 2, illustrated are the input and output signals of the repeater circuit 100 according to the present invention. Now referring to a port A 422 of repeater circuit 100, SCSI_A<53 . . . 0> 50 represents fifty-four signals that repeater circuit 100 can provide to and receive from a wide multi-mode SCSI bus coupled to port A 422. As explained further below, SCSI_A<53 . . . 0> 50 can address up to 16 SCSI bus devices during a SCSI address phase through data signals of SCSI_A<53 . . . 0> 50, represented by DBA<15 . . . 0>. An initiator, or controller (not shown in FIG. 2A), is coupled to SCSI A<53 . . . 0>50 and occupies one SCSI device address, or SCSI ID. A SCSI ID refers to one bit of the data bus of the SCSI bus, DBA<15 . . . 0>, that is assigned to a SCSI device. Targets, such as disk drives, typically occupy the remaining 15 SCSI IDs.

In normal operation, the repeater circuit 100 drives all signals asserted on port A 422 to a port B 424 and all signals asserted on port B 424 to port A 422. An INT_A signal 432 is a non-inverting, bi-directional, buffered signal that flows between port A 422 and port B 424 that is not critical to the present invention. If the signal is asserted on an INT_B signal 446 of port B 424 first, it flows to the INT_A signal 432 of port A 422. If the signal is asserted on the INT_A signal 432 of port A 422 first, it flows to the FNT_B signal 446 of port B 424. Under some circumstances, a signal asserted by a SCSI controller on either INT_A 432 or INT_B 446 may be reasserted on both.

A DRIVER_MODE_A signal 440 controls the SCSI buffer driver modes for SCSI_A 50. Possible mode values include single-ended, low voltage differential, and disabled. Repeater circuit 100 always presents a high input impedance at ports A 422 and B 424. When the DRIVER_MODEA signal 440 is not disabled, repeater circuit 100 is enabled and allows the SCSI bus signals SCSI_A<53 . . . 0>50 and a SCSI_B<53 . . . 0> 352 to pass through repeater circuit 100 to their respective buses. When the DRIVER_MODE_A signal 440 is disabled, repeater circuit 100 is disabled and the SCSI bus signals SCSI_A<53 . . . 0> 50 and SCSI_B<53 . . . 0> 352 are not allowed to propagate through repeater circuit 100. The current mode of the DRIVER_MODE_A signal 440 is determined by checking a DIFFSENSE[13] A signal 438. In addition, there is a DIFFSENSE override function associated with the DIFFSENSE_A signal 438 that consists of an open drain that forces SCSI_A 50 into a single-ended mode by driving the DIFFSENSE_A signal 438 pin to between 0 V and +5.0 V.

Now referring to port B 424 of repeater circuit 100, SCSI_B<53 . . . 0> represents the signals that repeater circuit 100 can provide to and receive from a wide multi-mode SCSI bus coupled to port B 424. Similar to SCSI_A<53 . . . 0>, SCSI_B<53 . . . 0> includes data signals, represented by DBB<15 . . . 0>, that can address up to sixteen SCSI devices. In the described system embodiments utilizing repeater circuit 100, discussed further below, port B 424 may be coupled to narrow SCSI buses that can address a limit of eight SCSI devices. Additionally, as described further below, an embedded controller (not shown in FIG. 2) coupled to SCSI_B<53 . . . 0> performs monitoring and housekeeping functions for drives coupled to SCSI_B<53 . . . 0>. The embedded controller does not occupy a SCSI ID. The functions and operations of the embedded controller are further described in U.S. patent application Ser. No. 07/955,669 entitled "Method of Communicating With a SCSI Bus Device That Does Not Have An Assigned SCSI Address."

SCSI_B 352 has two REQ and four ACK signals as an aid to system signal integrity. When a REQ or an ACK is an input, all REQs or ACKs respectively are ORed together to create the input signal. During normal operation, only one REQ or ACK will be asserted during a transfer. When a REQ or ACK is an output, all the REQs or ACKs respectively are driven identically.

The INT_B signal 446 on port B 424 corresponds to the INT_A signal 432 on port A 422 and provides the same functionality in the opposite direction. A DRIVER_MODE_B signal 454 controls the SCSI buffer driver modes for SCSI_B 352. Possible mode values include single-ended, low voltage differential, and disabled. Port A 422 and Port B 424 can operate simultaneously in different modes. When the DRIVER_MODE_B signal 454 is not disabled, repeater circuit 100 is enabled and allows the SCSI bus signals SCSI_A< 53 . . . 0> 50 and SCSI_B<53 . . . 0> 352 to pass through repeater circuit 100 to their respective buses. If neither the DRIVER_MODE_A 440 nor the DRIVER_MODE_B 454 is disabled, the repeater circuit 100 allows signals to pass between port A 422 and port B 424. When the DRIVER_MODE_B 454 is disabled, repeater circuit 100 is disabled and the SCSI bus signals SCSI_A<53 . . . 0> 50 and SCSI_B<53 . . . 0>352 are not allowed to propagate through repeater circuit 100. The current mode of the DRIVER_MODE_B 454 is determined by checking a DIFFSENSE_B signal 452. In addition, there is a DIFFSENSE override function associated with the DIFFSENSE_B signal 452 that consists of an open drain that forces SCSI_B 352 into a single-ended mode by driving the DIFFSENSE_B signal 452 pin to between 0 V and +5.0 V.

Now referring to signals not specific to either port A 422 or port B 424, a CLOCK_IN signal 428 provided to control all timing internal to the repeater circuit 100. Typically, the signal is 40 Mhz with a 60/40 duty cycle. In the present example, the repeater circuit 100 may multiply the CLOCK_IN signal 428 to derive a 240 Mhz clock used internal to the repeater circuit 100.

An ID_MAP_ENABLE ("MAP") signal 434 causes narrow targets on the SCSI_B <53 . . . 0>352 to be mapped to the high addresses on SCSI_A 50. A PHASE_LOCK_LOOP_LOCK (PLL) signal 450 reports, when interrogated, whether a PLL in the repeater circuit 100 is locked or unlocked. A RESET signal 436 puts the repeater circuit 100 into a known state. A TEST_MODE signal 448, when asserted, forces the repeater circuit 100 into a test mode such as a pass-through mode that passes all signals from the port A 422 to pass unchanged to port B 424. A COMM_IN <7 . . . 0> signal 442 represents additional data lines that are not critical for the present invention. The COMM_IN signal 442 may be utilized, for instance, during in-band communication as described in U.S. patent application entitled "Communication Mode Between SCSI Devices."

The SCSI buses coupled to ports A 422 and B 424 undergo SCSI bus phases which include address and data SCSI bus phases. Because both of these SCSI buses concurrently undergo the same phase, the phase occurring on both buses will be referred to as the SCSI bus phase.

Address translation, or mapping functions, for repeater circuit 100 are enabled by asserting the MAP signal 434 of repeater circuit 100. When the MAP signal 434 is TRUE, repeater circuit 100 performs address translation during address phases of the SCSI bus, as explained below. The term address phases collectively refers to SCSI ARBITRATION, SELECTION and RESELECTION bus phases which are well-known to those skilled in the art.

The SCSI buses also undergo data phases. The term data phases collectively refer to SCSI COMMAND, DATA, STATUS and MESSAGE bus phases which are well-known to those skilled in the art. During data phases, the data signals on the SCSI buses coupled to ports A 422 and B 424, represented by DBA<15 . . . 0> and DBB<15 . . . 0>, are transferred asynchronously or synchronously through repeater circuit 100, as explained below in conjunction with the discussion of FIG. 5. Furthermore, during data phases, DBA<15 . . . 0> and DBB<15 . . . 0> are mapped directly to each other which means DBA<15>is mapped to DBB<15>, DBA<14> is mapped to DBB<14> and so forth.

Now briefly describing the address translation provided by repeater circuit 100, which will be more fully discussed below, during SCSI bus address phases, the data signals on the SCSI buses are transferred asynchronously through repeater circuit 100, and during the address phases, the data signals correspond to the SCSI IDs; therefore, DBA<15 . . . 0> may or may not be mapped directly to DBB<15 . . . 0> as explained below. When the MAP signal 434 is FALSE, repeater circuit 100 does not perform any address translation during address phases of the SCSI bus. As discussed in greater detail below, when the MAP signal 434 is TRUE, during the address phases, the high SCSI IDs present on DBA<14 . . . 8> are mapped to the low SCSI IDs present on DBB<6 . . . 0>, and DBA<6 . . . 0> are mapped to DBB<14 . . . 8>. This address translation allows a target device coupled to port B 424 that has a low SCSI ID, ID0–ID6, to be addressable with a high SCSI ID, ID8–ID14, by an initiator coupled to port A 422, the advantages of which will become apparent below.

Figure 3:
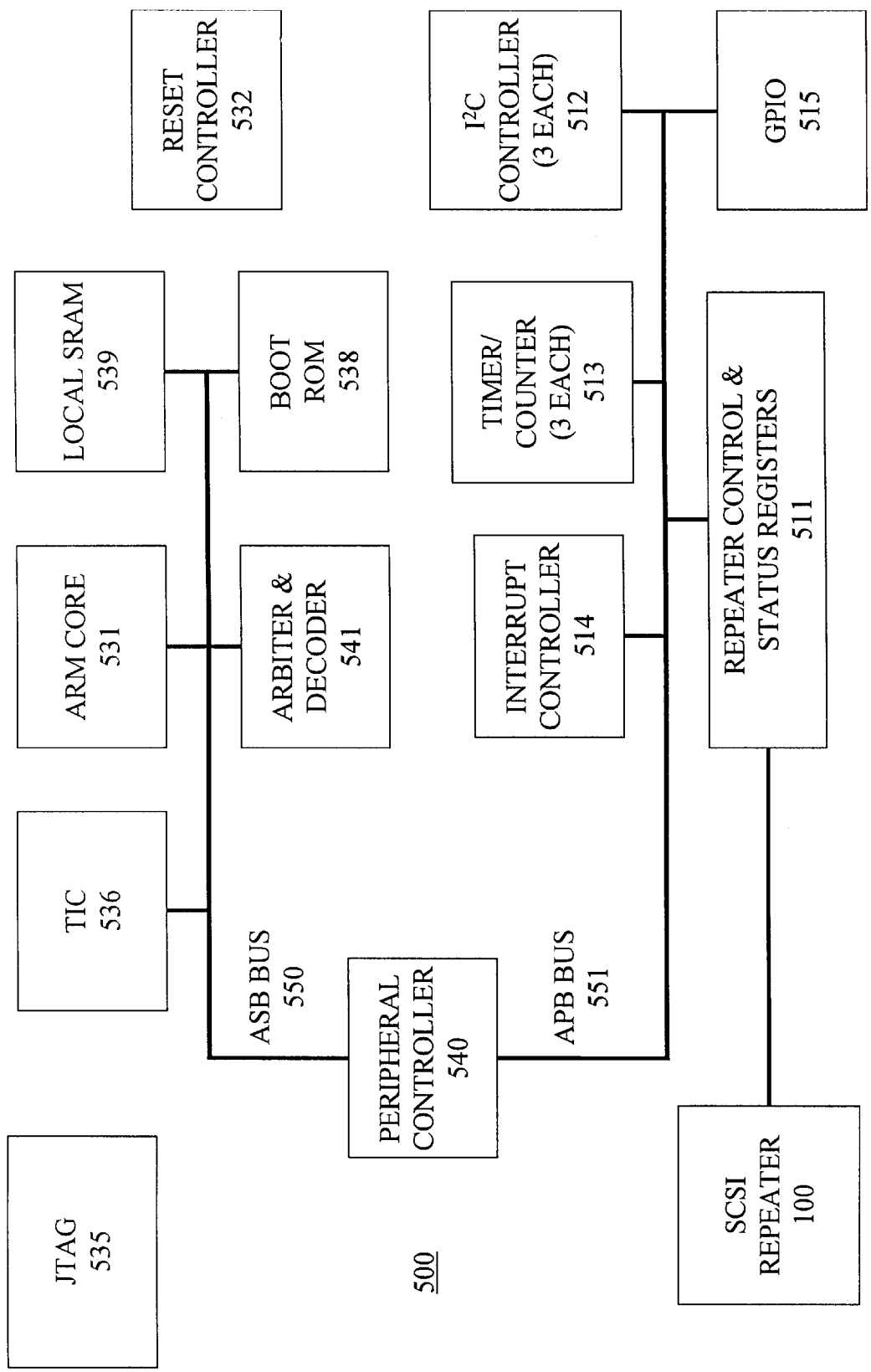
FIG. 3 is a internal block diagram of a typical SCSI repeater incorporating the repeater circuit of FIG. 2.

FIG. 3 is a block diagram illustrating a typical SCSI controller 500 incorporating the device of the present invention. The repeater circuit 100 is connected to repeater control and status registers (RCSR) 511 through an APB bus 551. The RCSR 511 contains registers (not shown) that enable the repeater circuit 100 to participate in the SCSI bus 50. Typically, some control bits within the registers of the RCSR 511 are only allowed to change when the SCSI bus 50 is not otherwise busy, preventing a communication failure between the rest of the controller 500 and the CLOCK_IN signal 428.

The internal controller 500 data processing is handled by an ARM core 531 that is connected to an ASB bus 550. A test interface controller (TIC) 536, incorporated into the ASB bus 550 transfers test data using to the controller 500 using a general purpose I/O block (GPIO) 515. A JTAG controller 535, using the data provided by the TIC 536 provides a way for software to externally check the ARM core 531 and a local static random access memory module (SRAM) 539. The SRAM 539 provides memory space for the controller 500.

A reset controller 532 provides an asynchronous, cold-reset signal that resets all of the controller 500 functions with the exception of the PLL in the repeater circuit 100. A deassertion of the cold reset signal releases all the controller 500 functions from reset with the exception of the repeater circuit 100 which must be released by software control.

The controller 500 contains three timer/counters 513 that are driven by the CLOCK_IN signal 428. Each timer/counter 513 can countdown to zero from a preset value up to two to the sixteenth power (65,536), at which time the timer/counter 513 generates an interrupt unless an associated interrupt mask in an interrupt controller 514 is enabled. The interrupt controller 514 services all components of the controller 500 that generate interrupts. In one embodiment of the present invention, events that can generate an interrupt are a valid controller 500 SELECTION phase event, an I²C controller 512 function, a timer/counter 513 counting down to zero, a state change at the GPIO 515, a SCSI bus 50 state change, a SCSI bus 352 state change, a DIFFSENSE_A 438 change, a DIFFSENSE_B 452 change, or an unlock event in the PLL of the repeater circuit 100.

Each of three I²C controllers 512 provide control for external I²C devices. A boot read-only memory (ROM) 538 contains code for a startup of the controller 500. When powered on, the boot ROM 538 checks for the SRAM 539 and, if the SRAM 539 is found, transfers operating code to it and transfers control to the TIC 536 or ARM core 531.

Finally, a peripheral controller 540 connects the ASB bus 550 with the APB bus 551 and a arbiter and control block 541 handles the SCSI buses 50 and 352 ARBITRATION logic and decodes SCSI commands.

FIG. 3 represents only one embodiment of a device incorporating the repeater circuit 100. Other embodiments may use additional, less or modified components.

Figure 4:
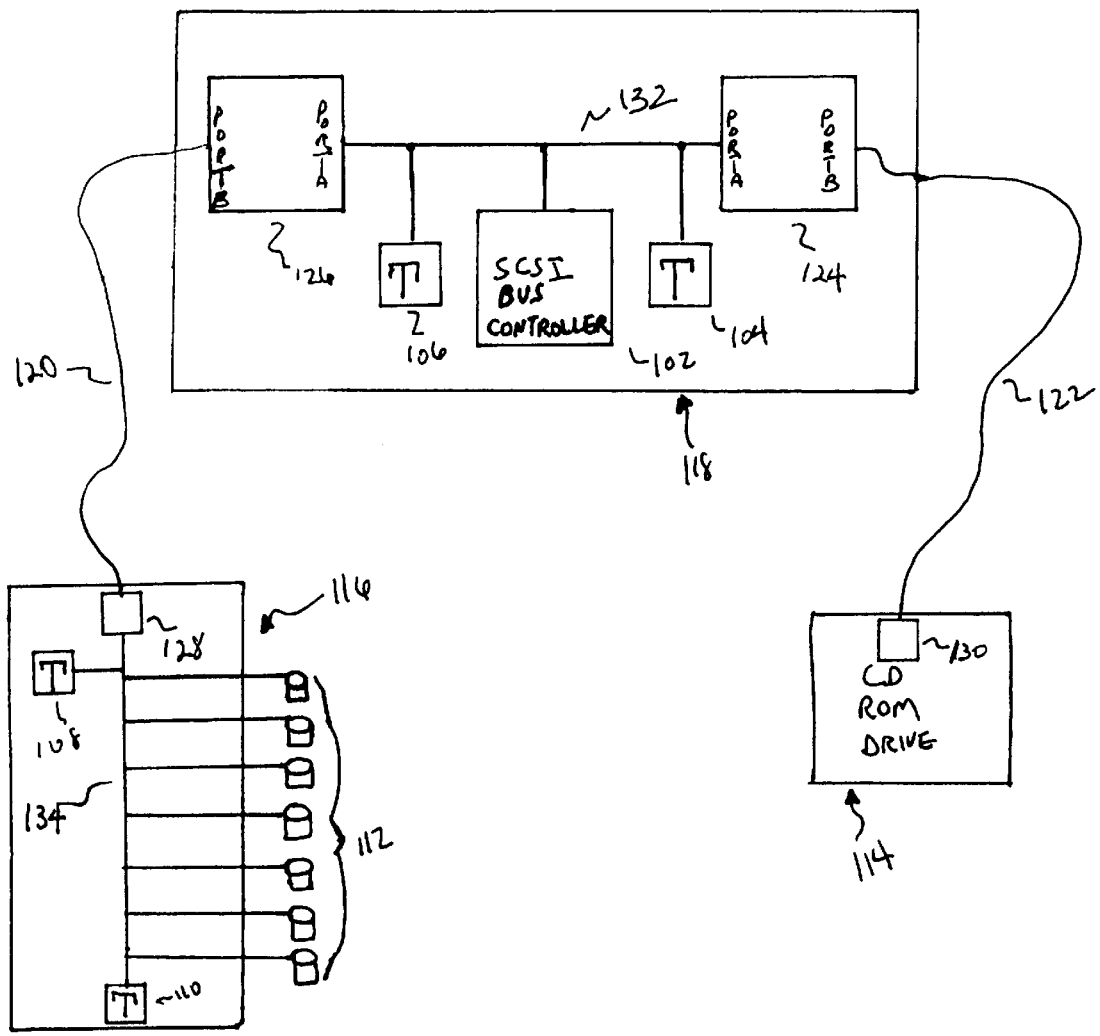
FIG. 4 is a block diagram illustrating a computing system utilizing the present invention to couple a SCSI bus of a server to SCSI buses of a disk drive array and a CD-ROM drive.

FIG. 4 is a block diagram illustrating a typical environment for repeater circuit 100. As shown in FIG. 4, a server 118 is coupled to a disk drive array 116 and a CD-ROM drive 114 through SCSI buses 120 and 122, respectively. A SCSI bus controller 102 is coupled to a terminated SCSI bus segment 132, which is terminated by active terminators 106 and 104. Repeater circuits 126 and 128, identical to repeater circuit 100, are coupled to the ends of SCSI bus 120. Storage system 116 includes a terminated SCSI bus segment 134, which is terminated by active terminators 108 and 110. Drives 112 are coupled to bus 134. Repeater circuits 124 and 130, identical to repeater circuit 100, are coupled to the ends of SCSI bus 122. Repeater circuits 124 and 126 buffer all SCSI bus signals from SCSI buses 122 and 120, thereby effectively preventing SCSI bus 132 from exceeding a predetermined length which would degrade performance of SCSI bus 132. Furthermore, repeater circuit 128 buffers all SCSI bus signals, thereby effectively preventing SCSI bus 134 from exceeding the predetermined length. Repeater circuit 130 performs the same function for CD-ROM drive 114. Thus, as shown in FIG. 4, by using short, terminated SCSI bus segments and repeater circuits, a long SCSI bus can be avoided and a high performance SCSI bus system can be maintained.

Figure 5:
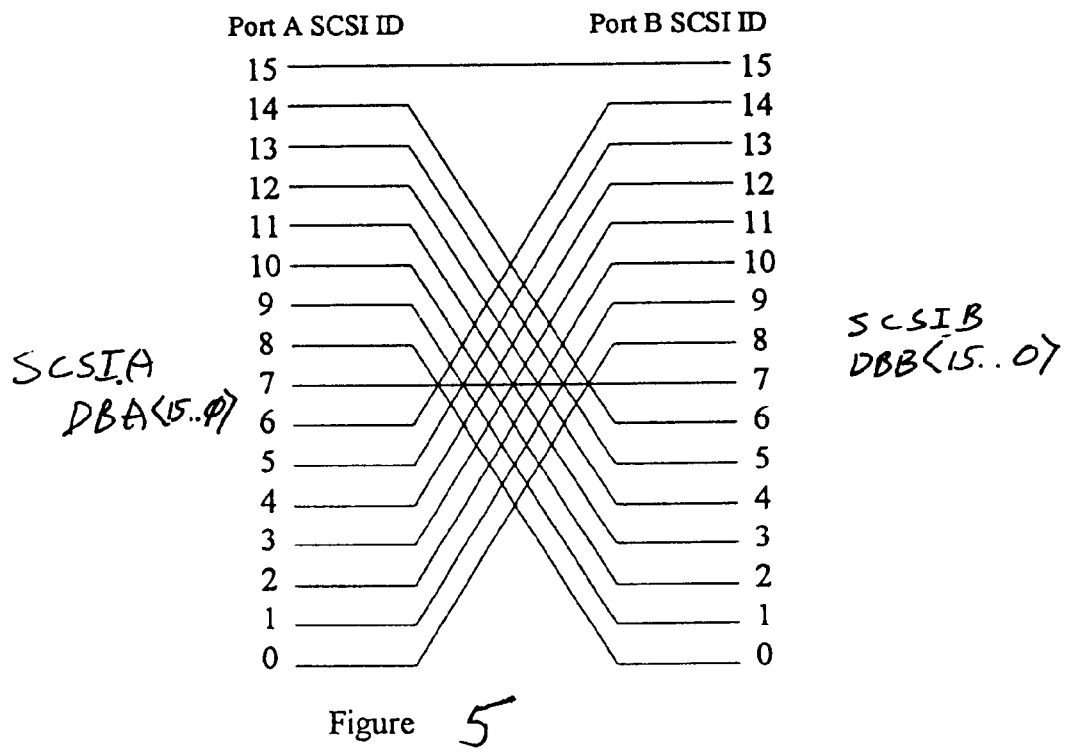
FIG. 5 is a diagram illustrating the address mapping according to the invention.

Turning now to FIG. 5, illustrated are the data signals DBA<15 . . . 0> and DBB<15 . . . 0> of SCSI_A 50 and SCSI_B 352 respectively when the MAP signal 434 is asserted. Low DBA<0 . . . 6> on port A 422 are mapped to high DBB<8 . . . 14> on port B 424. Specifically, DBA<0> is mapped to DBB<8>, DBA<1> is mapped to DBB<9>, and so on. In addition, high DBA<8 . . . 14> are mapped to low DBB<0 . . . 7>. DBA<8> is mapped to DBB<0>, DBA<9> is mapped to DBB<1> , and so on.

Data signal DBA<7> on port A 422 is mapped directly to data signal DBB<7> on port B 424 and data signal DBA<15> on port A 422 is mapped directly to DBB<15> on port B 424. In addition, the repeater circuit 100 guarantees that a low SCSI ID device represented by one of the data signals DBA<0 . . . 6> on port A 422 wins an ARBITRATION phase of the SCSI protocol by asserting DBB<7> on port B 424. The repeater circuit 100 ensures that SCSI ID represented by DBA<15> wins the ARBITRATION phase by asserting DBB<7> on port B 424. The assertion of DBB<7> on port B 424 only occurs during the ARBITRATION phase of the SCSI protocol and not during the SELECTION or RESELECTION phases.

Figure 6:
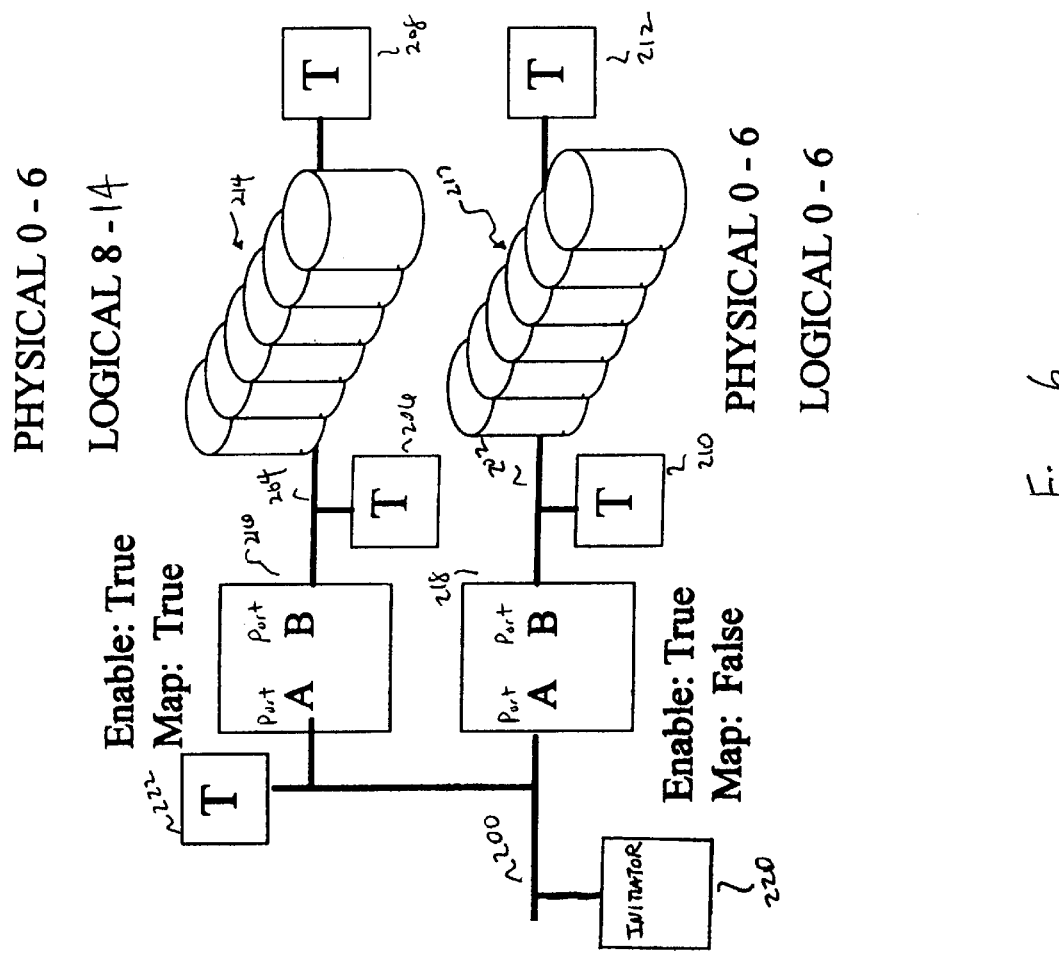
FIG. 6 is a block diagram illustrating a disk drive array configuration with a single initiator on a wide SCSI bus utilizing the present invention to access two disk drive arrays coupled to narrow SCSI buses.

Shown in FIG. 6 is a block diagram of a disk array configuration using repeater circuits that allows a SCSI bus controller, or initiator 220, coupled to a wide SCSI bus 200 to access both drives 214 and 217 which are coupled to narrow SCSI buses, 204 and 202, respectively. The repeater circuits shown in FIG. 6 are identical to repeater circuit 100. As explained below, drives 214 and 217 appear from the perspective of initiator 220 to be connected to a wide SCSI bus. SCSI bus 204 is terminated by active terminators 206 and 208; and SCSI bus 202 is terminated by active terminators 210 and 212. A repeater circuit 216 has its port B coupled to SCSI bus 204 and its port A coupled to SCSI bus 200. A repeater circuit 218 has its port B connected to SCSI bus 202 and its port A connected to SCSI bus 200. Repeater circuits 216 and 218 are enabled by having both of their enable inputs set equal to TRUE. An enabled repeater circuit will propagate buffered SCSI bus signals between port A and port B. A disabled repeater circuit does not pass the SCSI bus signals between ports A and B. Repeater circuit 216 has its address translation functions enabled, as further discussed below, by having its map input set equal to TRUE. The address translation functions of repeater circuit 216 are disabled because its map input is set equal to FALSE. An active terminator 222 is coupled to port A of repeater circuits 216 and 218.

Now describing operations for the system shown in FIG. 6, during a SCSI address phase, each of the data signals, or bits, on SCSI bus 200 correspond to a SCSI ID with initiator 220 occupying one SCSI ID on SCSI bus 200. The address phases include ARBITRATION, SELECTION and RESELECTION SCSI bus phases. In the SCSI bus protocol, an initiator desiring to access a target must first arbitrate for control of the SCSI bus during the ARBITRATION phase. If the initiator wins arbitration, the initiator then selects its target drive during a SELECTION phase. Similarly, if a target wants to communicate with an initiator, the target must first arbitrate for the bus during an ARBITRATION phase. If the target wins arbitration, then the target selects its initiator during a RESELECTION phase.

During the ARBITRATION phase of SCSI bus 200, if initiator 220 wants control of bus 200, initiator 220 sets its own ID bit. After waiting at least an arbitration delay, initiator 220 then examines SCSI bus 200 in order to determine whether it has won or lost arbitration during the ARBITRATION phase. If initiator 220 has won, then during the subsequent SELECTION phase of SCSI bus 200, initiator 220 sets the data bus of SCSI bus 200 to a value that is the logical OR of its own SCSI ID and the target drive's SCSI ID.

A similar procedure is used during a RESELECTION phase. RESELECTION is an optional phase that allows a target, such as a drive of drives 214 or 217, to be reconnected to an initiator, such as initiator 200, to complete an operation suspended by the target. Upon completing the ARBITRATION phase, the winning SCSI target then sets the data bus of SCSI bus 204 or 202 to a value that is the logical OR of the target's SCSI ID and the initiator's SCSIID.

As previously mentioned, both SCSI buses 204 and 202 are narrow SCSI buses which can address up to eight SCSI devices; however, SCSI bus 200 is a wide SCSI bus having 16 data bits which can address up to sixteen SCSI devices. Thus, for the configuration shown in FIG. 4, in the prior art, initiator 220 could only address seven SCSI devices on either narrow SCSI bus 202 or 204 with initiator 220 occupying one SCSI ID. Repeater circuit 100 allows initiator 220 to access up to 14 drives by accessing both narrow SCSI buses 204 and 202. As shown in FIG. 5, repeater circuit 218 is enabled, and its map input is set equal to FALSE. As explained above, repeater circuit 218 maps the seven lowest SCSI IDs of SCSI bus 200 to the seven SCSI IDs of SCSI bus 202 during the address SCSI bus phases. As shown in FIG. 6, repeater circuit 216 has its MAP signal 434 set equal to TRUE. As explained above, repeater circuit 216 maps the seven highest SCSI IDs (below ID15) of SCSI bus 200 to the seven SCSI IDs of low SCSI bus 204 during the address SCSI bus phases. The abovedescribed mapping transforms physical drives 217 into logical drives 0–6 and physical drives 214 into logical drives 8–14. These logical drives are addressable by logical SCSI IDs 0–6 and 8–14, denoted ID0–ID6 and ID8–ID14, respectively. The other Ids, ID7 and IDI5 are handled as discussed above. Thus, because the address translation functions of repeater circuit 216 are enabled, what would otherwise be considered SCSI ID0 on SCSI bus 204 is now logical SCSI ID8, SCSI IDI on SCSI bus 204 is now logical SCSI ID9 and so forth. This is further illustrated by the mapping shown in FIG. 5.

Figure 7:
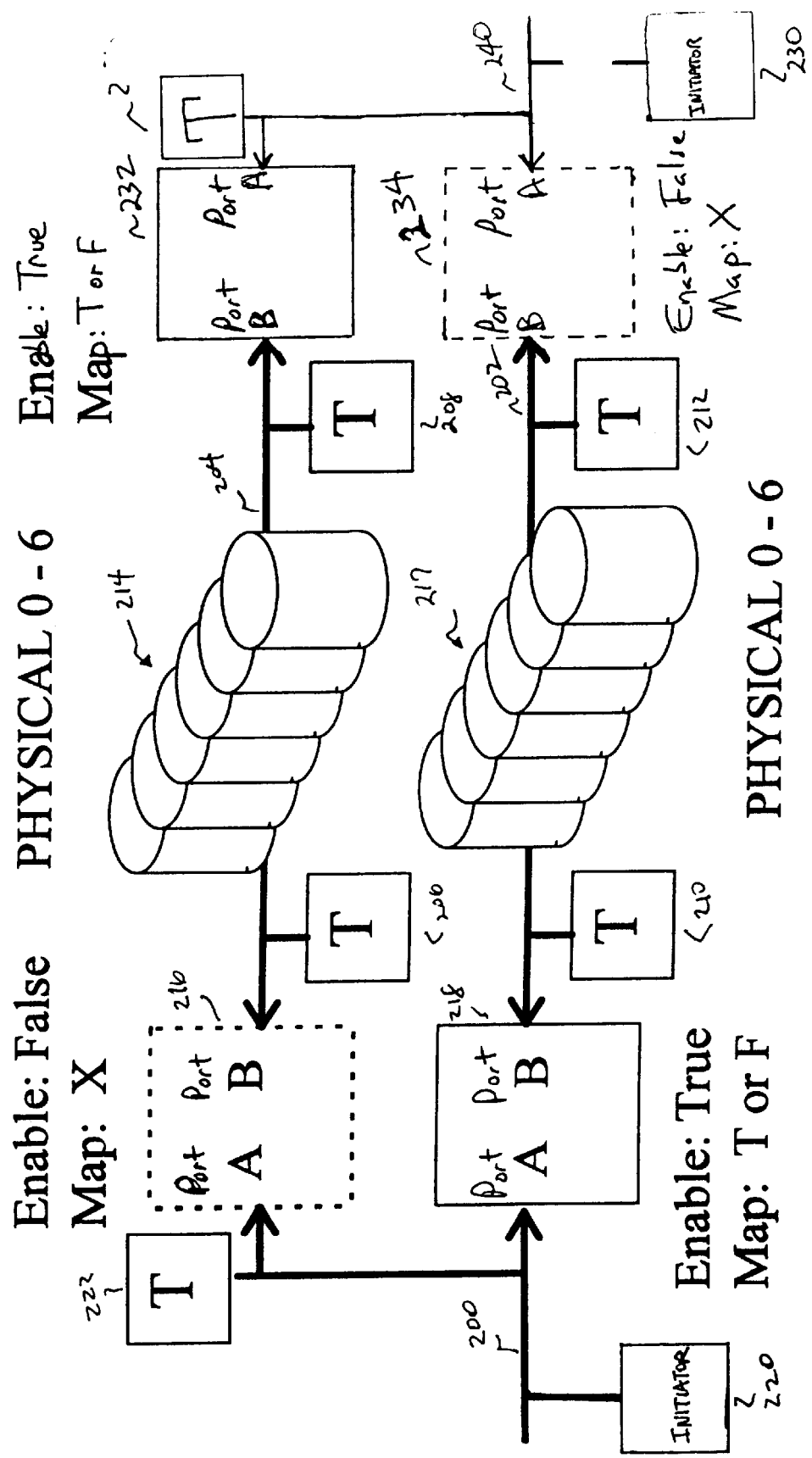
FIG. 7 is a block diagram illustrating a duplexed disk drive array configuration utilizing the present invention.

FIG. 7 is a block diagram illustrating a duplexed disk array configuration utilizing the present invention. Shown in FIG. 7 are two additional repeater circuits 232 and 234, identical to repeater circuit 100, which have their port B coupled to SCSI buses 204 and 202, respectively. Also shown in FIG. 7 is another initiator 230, which is coupled to a wide SCSI bus 240. SCSI bus 240 is coupled to port A of repeater circuits 232 and 234. An active terminator 236 is further coupled to port A of repeater circuits 232 and 234. As shown for this system, repeater circuit 216 has its enable input set equal to FALSE, and repeater circuit 218 has its enable input set equal to TRUE; therefore, initiator 220 has access to SCSI bus 202 but does not have access to SCSI bus 204. Thus, depending on the signal received at the map input of repeater circuit 218, drives 217 can be addressable by either the seven low or the seven high (below ID15) SCSI IDs on SCSI bus 200. Similarly, initiator 230 can access SCSI bus 204 because repeater circuit 232 has its enable input set equal to TRUE, and repeater circuit 234 has its enable input set equal to FALSE, which prevents initiator 230 from accessing bus 202. Thus, depending on the signal received at the map input of repeater circuit 232, initiator 230 can address drives 214 as either the seven high (below ID15) or the seven low SCSI IDs on SCSI bus 240.

Figure 8:
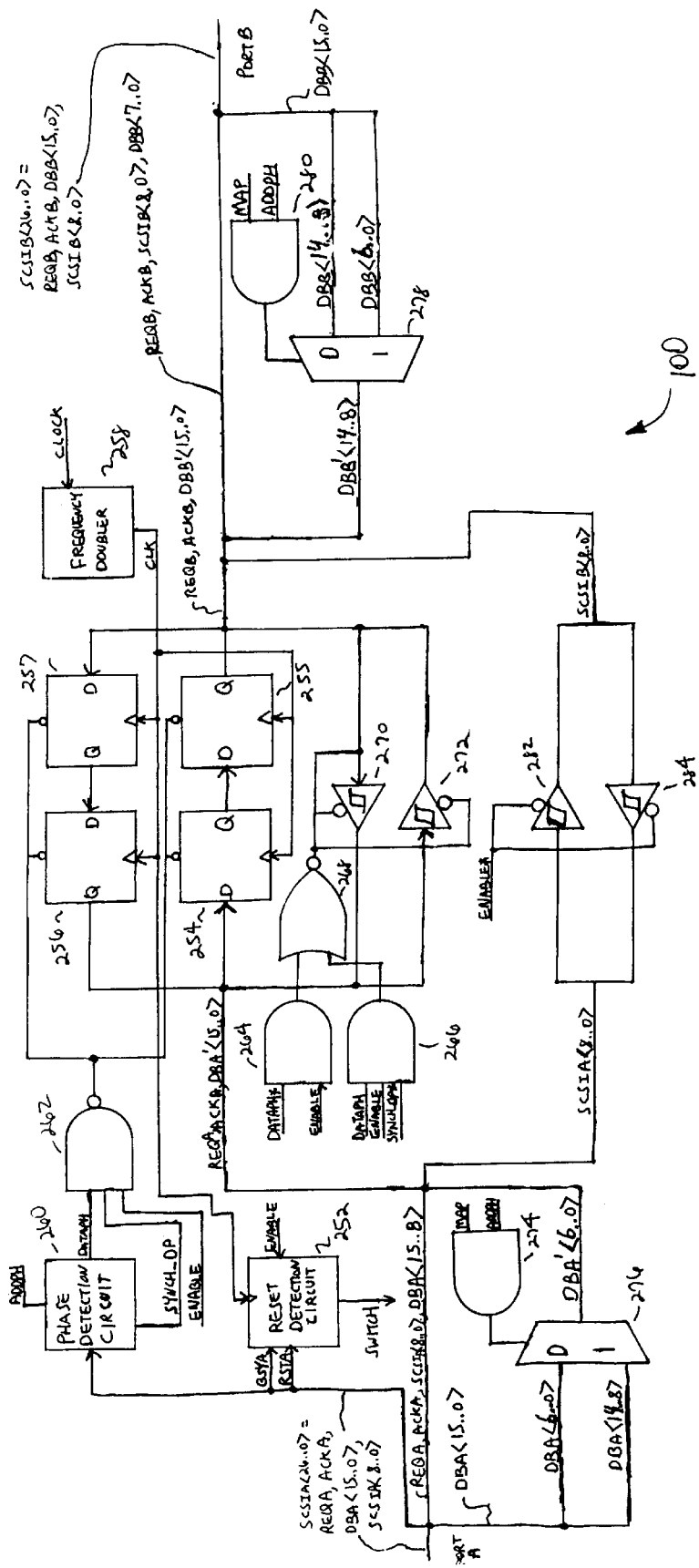
FIG. 8 is a block diagram illustrating the repeater circuit according to the present invention.

FIG. 8 is a block diagram illustrating the functional blocks of repeater circuit 100. Repeater circuit 100 has circuitry to buffer both synchronous and asynchronous data transfers; address translation circuitry to map the seven high (below ID15) SCSI IDs of a wide SCSI bus to the seven low SCSI IDs of a narrow SCSI bus; and reset detection circuitry to detect a predetermined number of uninterrupted SCSI bus reset signals, a sequence which indicates that a previously active server has failed.

Before discussing the circuitry shown in FIG. 8, a brief overview will be given of the signals received by repeater circuit 100. At port A 422, repeater circuit 100 receives SCSI_A<53 . . . 0> which represents the following signals: a SCSI bus request signal, REQA; a SCSI bus acknowledge signal, ACKA; and a 16-bit SCSI data bus represented by DBA<15 . . . 0>. The remaining signals represented by SCSI_A<53 . . . 0> are represented by SCSI_A<8 . . . 0>. Similarly, for port B 424, repeater circuit 100 receives signals represented by SCSI_B<53 . . . 0> which includes a SCSI bus request signal, REQB; a SCSI bus acknowledge signal, ACKB; and a sixteen bit SCSI data bus represented by DBB<15 . . . 0>. The remaining signals of SCSI_B<53 . . . 0> are represented by SCSIB<8 . . . 0>.

Now referring to the circuitry of repeater circuit 100 used to synchronously transfer data through repeater circuit 100 during synchronous SCSI bus data phases, shown in FIG. 8 are four D-type flip-flops 254–257 that perform bitwise operations. The noninverting outputs of flip-flops 255 and 256 are disabled when these outputs would normally be negated. Flip-flop 257 receives REQB, ACKB and signals represented by DBB'<15 . . . 0> at its D input. DBB'<15 . . . 0> represents the output of address translation circuitry that receives the data bus represented by DBB<15 . . . 0>. The non-inverting output of flip-flop 257 is coupled to the D input of flip-flop 256. The non-inverting output of flip-flop 256 provides REQA, ACKA, and DBA'<15 . . . 0>. DBA' represents the output of the address translation circuitry that receives the data bus represented by DBA<15 . . . 0>. The non-inverting output of flip-flop 256 is also coupled to the D input of flip-flop 254. The output of flip-flop 254 is coupled to the D input of flip-flop 255, and the non-inverting output of flip-flop 255 is coupled to the D input of flip-flop 257. Flip-flops 254, 255, 256 and 257 all receive a clock signal, CLK, from a frequency doubler 258 at their respective clock inputs. Frequency doubler 258 receives the system clock signal, CLOCK, a 40 MHz signal, and provides CLK, an 80 MHz signal.

When enabled, flip-flops 254, 255, 256 and 257 synchronously transfer data through repeater circuit 100. When this synchronous data transfer occurs, DBA'<15 . . . 0>, DBB'<15 . . . 0>, REQA, ACKA, REQB and ACKB are directly mapped to each other. Thus, DBA'<15> is mapped to DBB'<15>; DBA'<10> is mapped to DBB'<10>; REQA is mapped to REQB; and so forth. REQA, REQB, ACKA, ACKB, DBA'<15 . . . 0> and DBB'<15 . . . 0> will be collectively referred to as data signals.

The synchronous passage of the data signals through repeater circuit 100 can be controlled through the enable inputs of flip-flops 254, 255, 256 and 257, which are coupled to the output of a NAND gate 262. The inputs to NAND gate 262 include a data phase signal, DATAPH, which is asserted to indicate SCSI bus data phases and negated otherwise. Another input to NAND gate 262 is a synchronous data phase signal, SYNCH_DP, which when asserted indicates the data signals are to be transferred synchronously during the SCSI bus data phases. The synchronous data transfer phase is an optional data phase selectable by an initiator or target. A negated SYNCH_DP indicates asynchronous data transfers which means the data signals should be passed asynchronously through repeater circuit 100 during data phases. The third input to NAND gate 262 is the enable signal, ENABLE. DATAPH and SYNCH_DP are both provided by a phase detection circuit 260, which also provides an address phase signal, ADDPH. ADDPH indicates a SCSI address phase is present on the SCSI bus when asserted, and ADDPH is negated when an address phase is not present on the SCSI bus. Phase detection circuit 260 receives SCSI_A<26 . . . 0>. The design of phase detection circuit 260 is well-known to those skilled in the art. An overview of phase detection circuit 260 is discussed in conjunction with the discussion of FIG. 9. As shown in FIG. 10, NAND gate 262 enables the synchronous transfer circuitry, which includes flip-flops 254, 255, 256 and 257, when DATAPH is asserted, which indicates a data phase; when SYNCH_DP is asserted, which indicates synchronous data phase data transfers; and when ENABLE is asserted.

Also shown in FIG. 8 is circuitry to accomplish asynchronous transfers of the data signals through repeater circuit 100. This circuitry includes tristate buffers 270 and 272 that perform bitwise operations and have hysteresis. The outputs of buffers 270 and 272 are disabled when these outputs would normally be negated. Data signals are transferred asynchronously through repeater circuit 100 if either the SCSI bus is not in a data phase or the SCSI bus is using optional synchronous data transfers. Tristate buffer 270 receives REQB, ACKB and DBB'<15 . . . 0>. Tristate buffer 270 provides REQA, ACKA and DBA'<15 . . . 0>. Both tristate buffers 270 and 272 have their enable inputs connected to a NOR gate 268. NOR gate 268 has one input connected to the output of an AND gate 264 and one input connected to the output of an AND gate 266. AND gate 264 receives at one input the inverted data phase signal, DATAPH*, wherein "*" denotes negative logic, and AND gate 264 receives at its other input the enable signal, ENABLE. AND gate 266 receives at one input the data phase signal, DATAPH, and receives at another input ENABLE. AND gate 266 receives the inverted synchronous data phase signal, SYNCH_DP*, at its third input. Thus, as shown in FIG. 8, when the SCSI bus is not in a data phase, AND gate 264 enables tristate buffers 270 and 272. When the SCSI bus is in a data phase and SYNCH_DP is negated, which indicates asynchronous data transfers, AND gate 266 enables tristate buffers 270 and 272 through NOR gate 268.

Also shown in FIG. 8 is circuitry to handle the asynchronous transfer of the remaining SCSI bus signals, SCSI_A<8 . . . 0> and SCSI_B<8 . . . 0>. These signals are directly 25 mapped to each other. Thus, SCSI_A<8> is mapped to SCSI_B<8>, SCSI_A<7> is mapped to SCSI_B<7> and so forth. As shown in FIG. 8, tristate buffers 282 and 284, having hysteresis and performing bitwise operations, are connected to the inverted enable signal, ENABLE*. The outputs of buffers 282 and 284 are disabled when these outputs would normally be negated. When ENABLE is TRUE, both tristate buffers 282 and 284 are enabled. Tristate buffer 282 receives SCSI_A<8 . . . 0>, and the output of tristate buffer 282 provides SCSI_B<8 . . . 0>. Similarly, tristate buffer 284 receives SCSI_B<8 . . . 0>, and the output of tristate buffer 284 provides SCSI_A<8 . . . 0>.

Also shown in FIG. 8 is the address translation circuitry of repeater circuit 100, which provides address translation when the MAP signal 434 is TRUE and the SCSI bus is in an address phase. On the port A 422 of repeater circuit 100, the data bus from the SCSI bus coupled to port A 422, represented by DBA<15 . . . 0>, is provided to the address translation circuitry. The address translation circuitry provides DBA'<15 . . . 0> that is transferred through either the asynchronous or synchronous circuitry of repeater circuit 100. If repeater circuit 100 has its MAP signal 434 set equal to TRUE and an address phase exists, then DBA<14 . . . 8> of the SCSI bus coupled to port A 422, are mapped to DBB<6 . . . 0> of the SCSI bus coupled to port B 424. DBA<6 . . . 0>, are provided to the zero input of a multiplexor 276 which provides the DBA'<6 . . . 0>. The one input of multiplexor 276 is coupled to DBA<14 . . . 7> of the SCSI bus coupled to port B. The select input of multiplexor 276 is coupled to the output of an AND gate 274, which receives at its inputs the MAP signal 434 and the address phase signal, ADDPH. Thus, as shown in FIG. 8, when both MAP 434 and ADDPH are asserted, DBA<14 . . . 8> is directly mapped to DBA'<6 . . . 0>. Thus, DBA<14> is mapped to DBA'<6>, DBA<13> is mapped to DBA'<5>, DBA<12> is mapped to DBA'<4> and so forth. When either the map input is set equal to FALSE or the SCSI bus is not in an address phase, then DBA<6 . . . 0> is directly mapped to DBA'<6 . . . 0>.

Similarly, on the port B 424 side of repeater circuit 100, a multiplexor 278 receives at its zero input the DBB<14 . . . 8>, and receives at its one input DBB<6 . . . 0>. During address phases, multiplexor 278 provides DBB'<14 . . . 8>. The select input of multiplexor 278 is coupled to the output of an AND gate 280, which receives at its inputs the MAP signal 434 and ADDPH. Thus, when the MAP signal 434 of repeater circuit 100 is set equal to TRUE and the SCSI bus is in an address phase, DBB<6 . . . 0> of the SCSI bus coupled to port B 424 are directly mapped to DBA<14 . . . 8> of the SCSI bus coupled to port A 422. When either the MAP signal 434 is set equal to FALSE or no SCSI address phase exists, then DBB'<15 . . . 8> is directly mapped to DBB<15 . . . 8>.

In all cases, DBB<15> is mapped to DBA<15> and DBB<8> is mapped to DBA<8>. Further, it would be appreciated that the circuitry of FIG. 6 suffices to map high data bits on port A to the low data bits on port B, and the low data bits on port B to high data bits on port A. This circuitry is effectively repeated to provide the corresponding mapping of low data bits on port A to high data bits on port B and high data bits on port B to low data bits on port A.

Further, the repeater guarantees a low SCSI device arbitrating on the port A will win arbitration on the B port. It does this by asserting the DBB<7> during the ARBITRATION phase. It also guarantees the ID15 on the A port will win arbitration over a low ID on the B port by asserting DBB<7> on the B port during the ARBITRATION phase; it does not contaminate the SELECTION or RESELECTION phase. Further, during SELECTION and RESELECTION, the repeater 100 maps parity, good or bad, from the low input port to the high output port and the high input to the low output port. The exception is the low output parity is made good if the high input port is not driven—i.e., a narrow device is connected to that port.

Also shown in FIG. 8 is a reset detection circuit 252 which receives a SCSI bus busy signal from port A 422, BSYA, and a SCSI bus reset signal from port A, RSTA. Reset detection circuit 252 also receives ENABLE and provides SWITCH.

Summarizing the high level block diagram of FIG. 8, flip-flops 254, 255, 256 and 257 provide synchronous transfer of the SCSI data signals through repeater circuit 100 during data phases for optional synchronous data transfers. Tristate buffers 270 and 272 provide asynchronous transfers of the SCSI data bus through repeater circuit 100 during non-data phases and during data phases when the synchronous data transfer phase is not selected. Tristate buffers 282 and 284 provide asynchronous data transfers through repeater circuit 100 for the remaining signals of the SCSI buses. During address phases when the mapping functions of repeater circuit 100 are enabled, multiplexors 276 and 278 map the eight highest SCSI IDs on the SCSI bus coupled to port A 422 to the eight lowest SCSI IDs on the SCSI bus coupled to port B 424.

Figure 9:
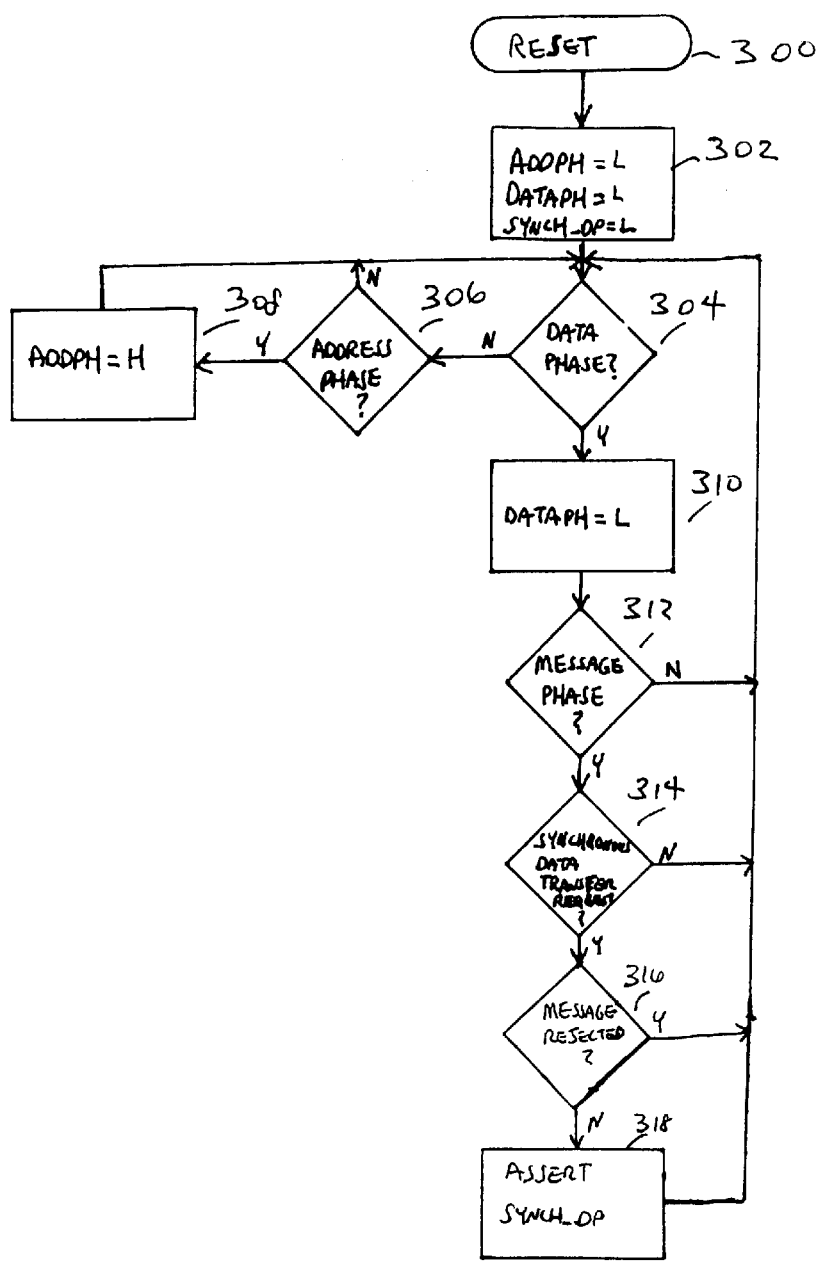
FIG. 9 is a flowchart diagram illustrating the phase detection circuit of the repeater circuit of FIG. 8 according to the present invention.
Figure 10:
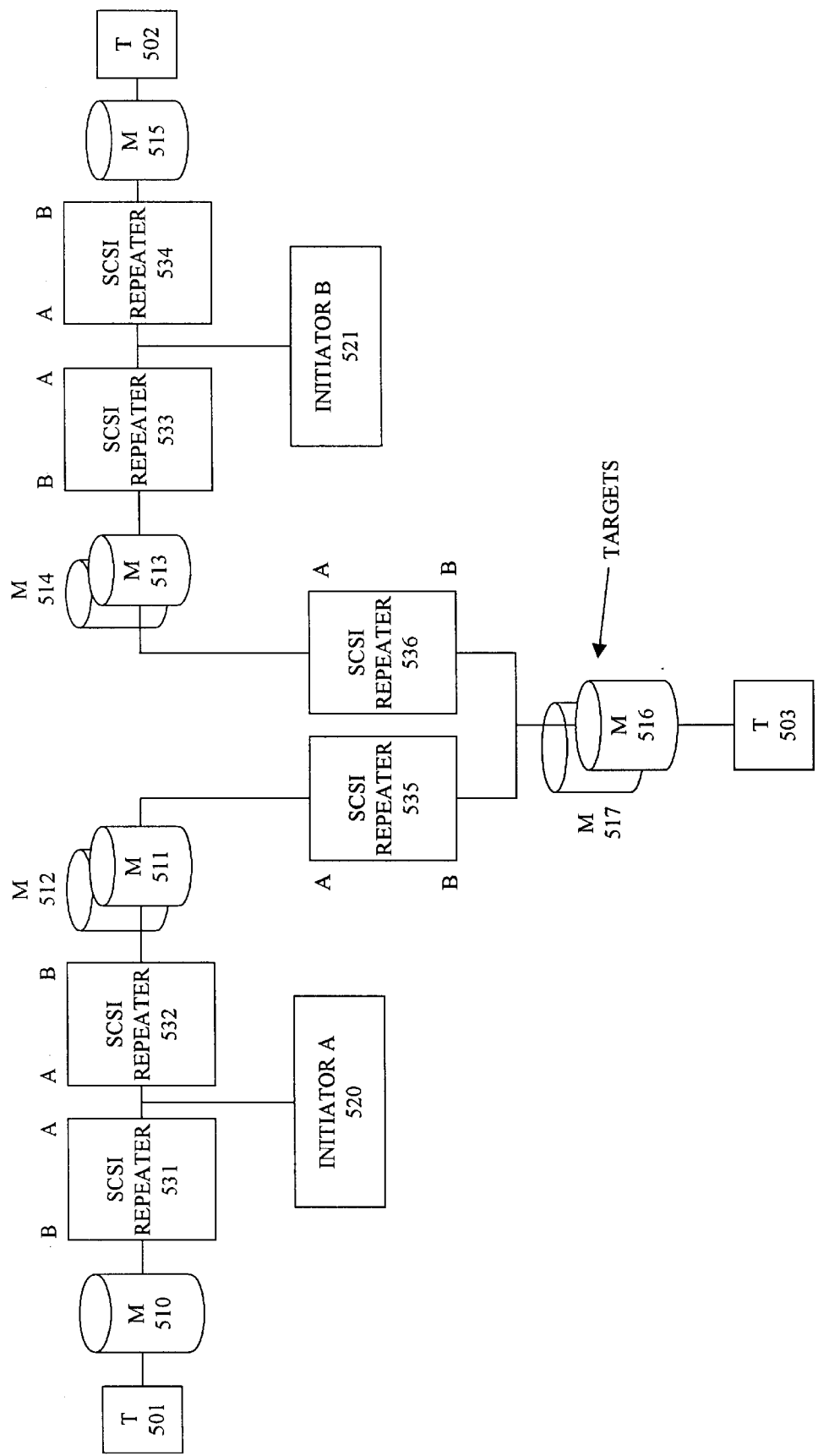
FIG. 10 is a block diagram illustrating multiple, terminated SCSI segments employing the present invention.

Shown in FIG. 9 is a flowchart diagram illustrating the logic of phase detection circuit 260. Now referring to FIG. 9, in step 300, repeater circuit 100 is in reset. Control then transfers from step 300 to step 302 where phase detection circuit 260 negates ADDPH, DATAPH, and SYNCH_DP. Control then transfers from step 302 to step 304 where phase detection circuit 260 determines whether the SCSI bus is in a data phase, and if so, then control transfers from step 304 to step 310 where phase detection circuit 260 negates DATAPH. Control then passes from step 310 to step 312 where phase detection 260 determines whether a SCSI MESSAGEIN phase exists, and if not, control transfers back to step 304. SCSI MESSAGEIN phases are data transfer phases and, as their name implies, are used to transfer messages between SCSI devices. Control passes from step 312 to step 314 if a MESSAGE_IN phase does exist to determine whether a SYNCHRONOUS DATA TRANSFER REQUEST code has been transmitted. This code is transmitted by an initiator or target during a MESSAGE_IN phase to indicate a synchronous data transfer is desired. If the SYNCHRONOUS DATA TRANSFER REQUEST code has not been transmitted, then control transfers from step 314 to step 304. If in step 314 a SYNCHRONOUS DATA TRANSFER REQUEST code has been transmitted by a SCSI device, then control transfers from step 314 to step 316 where phase detection circuit 260 determines whether the SYNCHRONOUS DATA TRANSFER REQUEST code was rejected by the initiator or target, and if so, control transfers to step 304. If not, control transfers from step 316 to step 318 where phase detection circuit 260 asserts SYNCH_DP. Control passes from step 318 back to step 304. If in step 304 the SCSI bus is not in a data phase, then control transfers from step 304 to step 306 where phase detection circuit 260 determines if the SCSI bus is in an address phase, then control transfers from step 306 back to step 304. If the SCSI bus is in an address phase, then control transfers from step 306 to step 308 where phase detection circuit 260 asserts ADDPH. Control then transfers from step 308 to step 304.

Summarizing the logic of phase detection circuit 260, phase detection circuit 260 determines whether the SCSI bus is in a data phase, and if so, phase detection circuit 260 determines whether the optional synchronous data transfer phase of the SCSI bus has been selected. Phase detection circuit 260 also determines whether the SCSI bus is in an address phase. After determining the phase of the SCSI bus, phase detection circuit 260 asserts DATAPH, ADDPH and SYNCH_DP accordingly.

Figure 11:
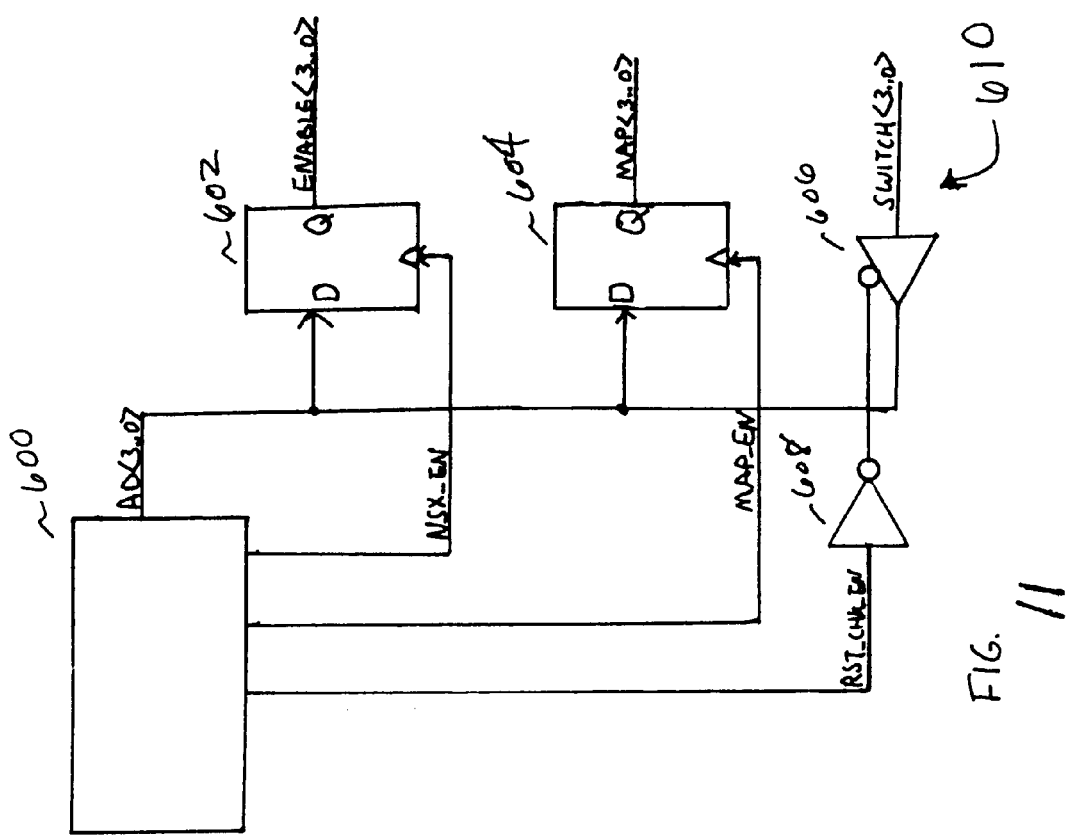
FIG. 11 is a schematic diagram illustrating a disk array embedded controller and associated circuitry according to the present invention.

Turning now to FIG. 10, illustrated is another embodiment of the device of the present invention connecting multiple, terminated SCSI segments. This embodiment shows one possible worst case scenario and demonstrates the importance of minimizing ARBITRATION and SELECTION delays through the repeater circuit 100, possible by means of a adjustable ACK, REQ timing scheme as described in U.S. patent application entitled "Set Up Time Adjust.". All of the repeater circuits described in FIG. 11 are identical to the repeater circuit 100.

A SCSI initiator A 520 is connected to a port A of a repeater circuit 531 and a port A of repeater circuit 532. Connected to a port B of repeater circuit 531 is a potential target memory device M 510. The SCSI bus connected to the port B of the repeater circuit 531 is a terminator 501. The initiator A 520 is also connected to a port A of another repeater circuit 532.

A memory device M 511 and a memory device M 512 are connected to a port B of the repeater circuit 532. Also connected through a port A to the port B of the repeater circuit 532 is another repeater circuit 535. A port B of the repeater circuit 535 is connected to potential target memory devices M 516 and M 517. The SCSI bus connected to the port B of the repeater circuit is terminated by a terminator T 503.

The right side of FIG. 10 has a similar configuration connected to the target memory devices M 516 and M 517 with an initiator B 521, repeater circuits 533, 534, and 536, memory devices M 513, M 514, M 515 and terminator T 502.

The FIG. 10 illustrates that initiators and targets can be on both ports A and B of a repeater circuit 100. In this embodiment, the MAP signal 434 that enables the mapping feature of the present invention described in FIG. 5 would only be asserted on the rightmost repeater circuit 534 and the leftmost repeater circuit 531.

Shown in FIG. 11 is a schematic diagram of an embedded controller circuitry 610 used to control the mapping and enabling functions of a plurality of repeater circuits 100. As shown in FIG. 11, an embedded controller 600, preferably an 87051 microcontroller manufactured by Intel Corporation, is used to monitor and direct housekeeping functions as described in U.S. patent application entitled "Method of Communicating With A SCSI Bus Device That Does Not Have An Assigned SCSI Address." The logic shown in FIG. 11 performs bitwise operations.

Controller 600 provides a data bus having signals represented by AD<3 . . . 0>, to the D input of a D-type flip-flop 602 and the D input of a D-type flip-flop 604. Controller 600 further asserts a signal, NSX_EN, to update signals used to enable or disable repeater circuits, the four signals being represented by ENABLE<3 . . . 0>. NSX_EN is provided to the clock input of flip-flop 602. ENABLE<3 . . . 0> are provided by the non-inverting output of flip-flop 602. Thus, when NSX_EN is asserted by controller 600, ENABLE<3 . . . 0> are updated.

Further, controller 600 asserts a signal, MAP_EN, to update signals represented by MAP<3 . . . 0> are used to enable or disable the mapping functions of the repeater circuits. MAP<3 . . . 0> are provided by the non-inverting output of flip-flop 604.

Figure 12:
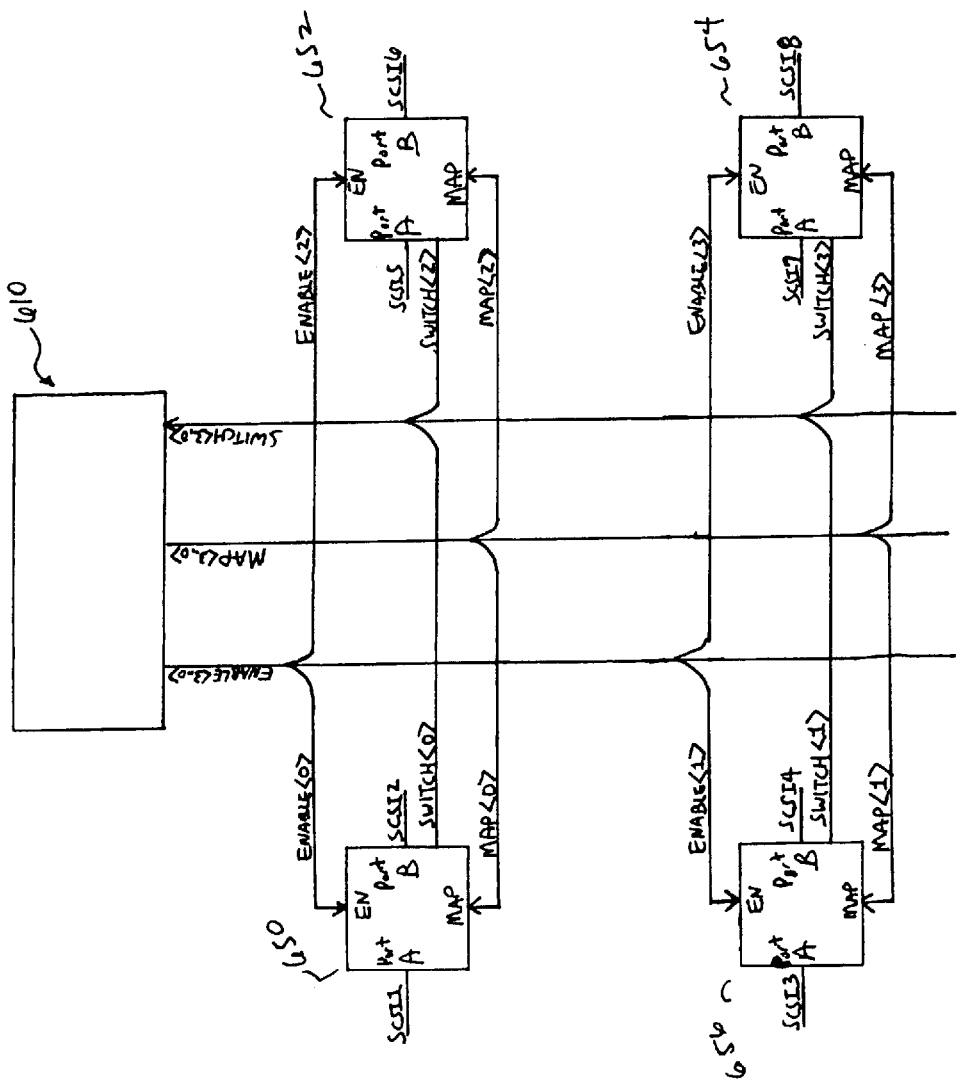
FIG. 12 is a schematic diagram illustrating a flexible disk array configuration for the mass storage system utilizing the present invention.

FIG. 12 is a schematic diagram illustrating a flexible configuration for four repeater circuits. Shown in FIG. 12 is embedded controller and related circuitry 610 which provides ENABLE<3 . . . 0> and MAP<3 . . . 0> to repeater circuits 650, 652, 654 and 656. Repeater circuits 650, 652, 654 and 656 provide four switch signals, represented by SWITCH<3 . . . 0>, to controller circuitry 610. The SWITCH<3:0> signal can be used to control device switching such as described in previously incorporated patent entitled "Multi-Server Fault Tolerance Using In-Band Signaling", and will not be discussed further. Now turning to the connections of repeater circuit 650, controller circuitry 610 provides a signal, ENABLE<0>, to the enable input of repeater circuit 650. Controller circuitry 610 also provides a signal, represented by MAP<0>, to the map input of repeater circuit 650. Repeater circuits 652, 654 and 656 receive ENABLE<2>, ENABLE<3> and ENABLE<1>, respectively, in a similar fashion. Also, repeater circuits 652, 654 and 656 receive MAP<2>, MAP<3> and MAP<1> in a similar fashion. Thus, controller circuitry 610 can enable and disable the repeater circuits based on the received switch signals, and controller circuit 610 can control the address translation functions of the repeater circuits.

In summary, the present invention relates to a repeater circuit for providing effective point-to-point coupling between terminated SCSI bus segments. The repeater circuit has an enable input; can perform SCSI ID address translation to map SCSI IDs from a narrow SCSI bus to high SCSI IDs on a wide SCSI bus; and has reset detection circuitry which provides a switch signal to indicate switchover of a fault tolerant disk array configuration. The switch signal is provided by the reset detection logic when a predetermined number of SCSI bus signals are received from a server that is taking over as the primary server. When disabled, the repeater circuit presents a high impedance to the terminated bus segments, and when enabled, the bus signals propagate through the repeater circuit.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A repeater circuit for providing buffered communications between a first bus having associated first bus signals and a second bus having associated second bus signals, the repeater circuit for use with a computing system providing a disable signal for disabling communications between the first and second buses, the repeater circuit comprising:

a first bus to second bus driver circuit coupled to the first bus and the second bus for receiving the first bus signals and the disable signal and for providing first bus buffered signals to the second bus indicative of the first bus signals, wherein said first bus to second bus driver circuit is disabled when the disable signal is received; and a second bus to first bus driver circuit coupled to the first bus and the second bus for receiving the second bus signals and the disable signal and for providing second bus buffered signals to the first bus indicative of the second bus signals, wherein said second bus to first bus driver circuit is disabled when the disable signal is received, wherein the computing system further includes a bus device coupled to the first bus having a first address on the first bus and a second address on the second bus, the computing system capable of either providing first bus signals to the first bus indicative of the first address or second bus signals to the second bus indicative of the second address during an address phase of the first and second buses, wherein the repeater circuit further comprising:

a bus phase detection circuit coupled to the first bus for detecting the address phase and for providing a phase signal indicative of the detection of the address phase, wherein the first bus to second bus driver circuit further includes a second bus address mapper for receiving the phase signal and an indication from the first bus of the frst address and for providing an indication of the second address to the second bus when the phase signal is received, and wherein the second bus to first bus driver circuit firther includes a first bus address mapper for receiving the phase signal and an indication from the second bus of the second address and for providing an indication of the first address to the first bus when the phase signal is received.

2. The repeater circuit of claimi 1, wherein the first and second buses are SCSI buses.

3. The repeater circuit of claim 1, wherein the first and second bus signals include a clock signal, wherein the first bus signals include data signals that are present during a data phase of the first and second buses, and wherein said first bus to second bus driver circuit operates synchronously with the clock signal to provide buffered data signals to the second bus indicative of the data signals during the data phase.

4. The repeater circuit of claim 1, wherein the first address is included in high address bits of the first bus and the second address is included in low address bits of the second bus.

5. The repeater circuit of claim 1, wherein the first and second bus signals include a clock signal, wherein the first bus signals include data signals that are present during a data phase of the first and second buses, and wherein the first bus to second bus driver circuit operates synchronously with the clock signal to provide buffered data signals to the second bus indicative of the data signals during the data phase.

6. A computing system, the computing system comprising:

a first bus having associated first bus signals; a second bus having associated second bus signals;

a repeater circuit comprising:

a first bus to second bus driver circuit coupled to the first bus and the second bus for receiving the first bus signals and a disable signal and for providing first bus buffered signals to the second bus indicative of the first bus signals, wherein said first bus to second bus driver circuit is disabled when the disable signal is received; and a second bus to first bus driver circuit coupled to the first bus and the second bus for receiving the second bus signals and the disable signal and for providing second bus buffered signals to the first bus indicative of the second bus signals, wherein said second bus to first bus driver circuit is disabled when the disable signal is received, the computing system further comprising:

a target coupled to the second bus having a first address on the first bus and a second address on the second bus, the target for providing second bus signals to the second bus indicative of the second address during an address phase of the first and second buses; and an initiator coupled to the first bus for providing first bus signals to the first bus indicative of the first address during the address phase, and wherein the repeater circuit further includes:

a bus phase detection circuit for detecting the address phase and for providing a phase signal indicative of the detection of the address phase, wherein the first bus to second bus driver circuit ehuer includes a second bus address mapper for receiving the phase signal and an indication from the first bus of the first address and for providing an indication of the second address to the second bus when the phase signal is received, and wherein the second bus to first bus driver circuit further includes a first bus address mapper for receiving the phase signal and an indication from the second bus of the second address and for providing an indication of the first address to the first bus when the phase signal is received.

7. The computing system of claim 6, wherein the first and second buses are SCSI buses.

8. The computing system of claim 6, wherein the first and second bus signals include a clock signal, wherein the first bus signals include data signals that are present during a data phase of the first and second buses, and wherein the first bus to second bus driver circuit operates synchronously with the clock signal to provide buffered data signals to the second bus indicative of the data signals during the data phase.

9. The computing system of claim 6, wherein the first address is included in high address bits of the first bus and the second address is included in low address bits of the second bus.

10. The computing system of claim 6,
wherein the first and second bus signals include a clock signal,
wherein the first bus signals include data signals that are present during a data phase of the first and second buses, and
wherein the first bus to second bus driver circuit operates synchronously with the clock signal to provide buffered data signals to the second bus indicative of the data signals during the data phase.

11. A repeater circuit for providing buffered communications between a first bus having associated first bus signals and a second bus having associated second bus signals, the repeater circuit for use with a computing system providing a mapping signal, the repeater circuit comprising:
a first bus to second bus driver circuit coupled to the first bus and the second bus for receiving the first bus signals and the mapping signal and, in response to the mapping signal, providing first bus buffered signals having a first address on the first bus to a second address on the second bus indicative of the first bus signals; and
a second bus to first bus driver circuit coupled to the first bus and the second bus for receiving the second bus signals and the mapping signal and, in response to the mapping signal, providing second bus buffered signals having the second address to the first address on the first bus indicative of the second bus signals.

12. A repeater circuit for providing buffered communications between a first bus having associated first bus signals and a second bus having associated second bus signals, the repeater circuit for use with a computing system providing a mapping signal, the repeater circuit comprising:
a first bus to second bus driver circuit coupled to the first bus and the second bus for receiving the first bus signals and the mapping signal and, in response to the mapping signal, providing first bus buffered signals having a first address on the first bus to a second address on the second bus indicative of the first bus signals,
wherein the first address is included in high bits of the first bus and the second address is included in low address bits of the second bus.

13. The repeater circuit of claim 12, wherein the first and second buses are SCSI buses.

14. A repeater circuit for providing buffered communications between a first bus having associated first bus signals and a second bus having associated second bus signals, the repeater circuit for use with a computing system providing a mapping signal, the repeater circuit comprising:
a first bus to second bus driver circuit coupled to the first bus and the second bus for receiving the first bus signals and the mapping signal and, in response to the mapping signal, providing first bus buffered signals having a first address on the first bus to a second address on the second bus indicative of the first bus signals,
wherein the first and second bus signals include a clock signal,
wherein the first bus signals include data signals that are present during a data phase of the first and second buses, and
wherein the first bus to second bus driver circuit operates synchronously with the clock signal to provide buffered data signals to the second bus indicative of the data signals during the data phase.

15. A computing system, the computing system comprising:
a first bus having associated first bus signals;
a second bus having associated second bus signals;
a target coupled to the second bus having a first address on the first bus and a second address on the second bus, the target for providing the second address to the second bus during an address phase of the first and second buses;
an initiator coupled to the first bus for providing the first address to the first bus during the address phase; and
a repeater circuit comprising:
a first bus to second bus driver circuit coupled to the first bus and the second bus for receiving the first bus signals and for providing first bus buffered signals to the second bus indicative of the first bus signals,
a second bus to first bus driver circuit for receiving the second bus signals and for providing second bus buffered signals to the first bus indicative of the second bus signals;
a bus phase detection circuit for detecting the address phase and for providing a phase signal indicative of the detection of the address phase; and
a first bus address mapper for receiving the phase signal and an indication from the first bus of the first address and for providing an indication of the second address to the second bus when the phase signal is received.

16. The computing system of claim 15, wherein the repeater circuit further includes:
a second bus address mapper for receiving the phase signal and an indication from the second bus of the second address and for providing an indication of the second address to the second bus when the phase signal is received.

17. The computing system of clahim 15, wherein the first :and second buses are SCSI buses.

18. The computing system of claim 15, wherein the first address is contained in high bits of the first bus and the second address is contained in the low bits of the second bus.

19. The computing system of claim 15, wherein the first and second bus signals include a clock signal,
wherein the first bus signals include data signals that are present during a data phase of the first and second buses, and
wherein said first bus to second bus driver circuit operates synchronously with the clock signal to provide buffered data signals to the second bus indicative of the data signals during the data phase.

* * * * *